(12) United States Patent
Smith (10) Patent No.: US 6,448,986 B1
(45) Date of Patent: Sep. 10, 2002

(54) METHOD AND SYSTEM FOR DISPLAYING GRAPHICAL OBJECTS ON A DISPLAY SCREEN

(75) Inventor: Kim C. Smith, Colleyville, TX (US)

(73) Assignee: Spotware Technologies LLC, North Sioux City, SD (US)

( * ) Notice: Subject to any disclaimer, the term of this patent is extended or adjusted under 35 U.S.C. 154(b) by 0 days.

(21) Appl. No.: 09/391,282

(22) Filed: Sep. 7, 1999

(51) Int. Cl.[7] .................................................. G09G 5/00
(52) U.S. Cl. ......................... 345/801; 345/815; 345/798
(58) Field of Search .................................. 345/764–769, 345/778–779, 781, 788, 790, 797, 798, 800, 801–803, 815

(56) References Cited

U.S. PATENT DOCUMENTS

| | | | | |
|---|---|---|---|---|
| 4,586,035 A | * | 4/1986 | Baker et al. ................. | 345/157 |
| 5,001,697 A | * | 3/1991 | Torres ........................ | 345/542 |
| 5,140,678 A | * | 8/1992 | Torres ........................ | 345/777 |
| 5,255,356 A | | 10/1993 | Michelman et al. ......... | 707/504 |
| 5,473,745 A | * | 12/1995 | Berry et al. ................. | 345/788 |
| 5,500,936 A | | 3/1996 | Allen et al. .................. | 345/808 |
| 5,506,952 A | | 4/1996 | Choy et al. .................. | 345/763 |
| 5,644,737 A | | 7/1997 | Tuniman et al. ............ | 345/810 |
| 6,072,486 A | * | 6/2000 | Sheldon et al. ............. | 345/835 |
| 6,307,574 B1 | * | 10/2001 | Ashe et al. .................. | 345/765 |

* cited by examiner

*Primary Examiner*—Raymond J. Bayerl
*Assistant Examiner*—Tadesse Hailu
(74) *Attorney, Agent, or Firm*—Richard Gilly; Mark S. Walker (57) ABSTRACT

A control program or operating system (28) manages a graphical user interface (21) of an electronic device (27) in such a way that substantially all of the screen of data (25) remains visible irrespective of whether toolbars or graphical objects (39) are displayed or hidden. The program or operating system rescales or resizes the data screen (25) to fit in whatever size display region (37) is available, such region (37) being generally smaller when graphical objects (39) are displayed on the display screen (31) and generally larger when the graphical objects (39) are hidden therefrom. The user displays graphical objects (39) in a corresponding tool area (55) defined in the display screen (31) by moving a cursor or other pointing device (33) into a control region (35) defined in the display screen (31). The control program or operating system (28) is useful not only with personal computer systems, but also with so-called "advanced" televisions, PC/TVs, and on manufacturing tools, office equipment, consumer electronic devices, and other devices having display screens and associated graphical user interfaces.

25 Claims, 6 Drawing Sheets

METHOD AND SYSTEM FOR DISPLAYING GRAPHICAL OBJECTS ON A DISPLAY SCREEN

FIELD OF THE INVENTION

This invention relates to graphical user interfaces for electronic displays, and more particularly, to a system and method for hiding and displaying graphical objects on a computer display, television monitor, or similar display screen for an electronic device.

BACKGROUND

Graphical user interfaces for information handling systems such as computers, as well as advanced televisions, and other devices with screen displays allow users to accomplish desired tasks more easily. In the case of computers, for example, textbased interfaces and operating systems typically require the user to remember the filename and path of an application program or command in order to execute it. In contrast, in graphical interfaces and operating systems, the user generally need only activate a graphical object, such as an "icon," menu item, or text label. The graphical object represents the application or command, and selecting the graphical object executes the application or command.

Similarly, in other devices with screen displays, graphical user interfaces may reduce or eliminate entirely the need for a keyboard or keypad. Again, in such devices, the user generally activates the desired program or enters the desired command by appropriately positioning a cursor or other pointing device over the graphical object.

Graphical objects may be arranged in physical sets, arrays, or functional groupings on the device display. Such groupings are referred to as "toolbars," "task bars," "control bars," "on-screen menus," and the like. Whether the display screen is part of a television, computer, photocopier, manufacturing apparatus, or consumer electronic device, the graphical objects associated with commands or procedures generally appear on the display screen along with another "active" area associated with the device. Graphical user interfaces of the current art generally display graphical objects as overlays on the work area of the display screen, that is, the graphical objects mask underlying portions of the work area, reducing the amount of information from the work area which can be viewed on the screen without scrolling. Otherwise stated, the display of toolbars is accomplished by the current art by reducing the amount of data visible in the work area of the display screen.

In advanced televisions, for example, a command menu or other information may be displayed at one side, overlaid on, and impinging upon, the main program being watched. In many computer software applications, arrays of graphical objects are overlaid on a main work area, often being arranged around the perimeter of the display screen.

A user's need to select graphical objects often depends on the data or image being displayed in the remaining work area of the display screen. As such, it is often necessary or desirable for the data or image associated with a desired command to be visible in the display screen's work area when the graphical object corresponding to the desired command is selected. Unfortunately, when one or more tool bars have been overlaid on the data screen, there is an increased likelihood that the desired data or the desired portion of the image has been covered up by the overlying toolbar(s).

This problem is rendered more acute as microchip performance increases. Increased microchip performance increases the likelihood of software programmers increasing the number of available commands or other menu items of applications or devices, and there is thus a corresponding need to make such commands available to the user in the form of graphical objects. The desire to keep such commands or items readily available for operating efficiency often results in the simultaneous display of multiple, adjacent toolbars, further diminishing the available area for display of data, and increasing the likelihood that the data which the user needs to see will be masked by display of the toolbars. The sacrifice of visible data to toolbars is further compounded if multiple work areas from multiple applications are displayed simultaneously on the same screen.

Furthermore, the display of multiple toolbars creates visual clutter on the display screen, which may distract a user of the display and which thus makes the use of the underlying computer-related invention less efficient.

Notebook, hand-held, and other smaller computers are becoming increasingly prevalent. Office equipment, manufacturing tools, and other devices are also more often equipped with operating displays. The smaller size of the display screens of such devices generally reduces the screen space available for displaying graphical objects, data, or both simultaneously. This, again, results in the increased potential of obscuring needed data on the display screen.

When this occurs, the user must either remove or move the overlaid toolbar(s) or scroll the data or image so that the appropriate portion is visible in the display region of the display screen. Removal of the obscuring toolbar(s) is generally a multi-step procedure under the current art and is thus relatively cumbersome. Even if removal of the obscuring toolbar is accomplished, such removal is counterproductive as, once the desired text or image has been uncovered by removal of the toolbar, the toolbar needs to be redisplayed in order to access the desired graphical object to be associated with such text or image. Relocation of the obscuring toolbar is likewise generally undesirable because the new location of the toolbar may also mask or impinge upon the data or image which needs to be viewed.

As a result of the foregoing, many users confronted with the need to locate data or image to be associated with a graphical object merely scroll around until the desired data is found. Such scrolling wastes time. Even in those cases where scrolling takes only a few seconds, the cumulative effect in terms of time and inconvenience can be much greater.

By needing to expend time to execute what should be relatively straightforward commands, the user of the graphical interface may become frustrated and the efficiency of operating the application may decline. The need to scroll the screen of data or image is only increased as the area occupied by toolbars increases relative to the area of the display region. As a result, the user must take additional steps to position the information needed at a location in the display region where it will not be masked by the display or selection of the toolbar. Such "advanced planning" merely for the purpose of activating a toolbar is an undesirable waste of time.

As a further alternative, the user can try to remember the data from the display region which is needed to appropriately activate the graphical object, but which will be masked by the display of such graphical object. This, again, at a minimum, is an inconvenience. In fact, since a main purpose in displaying graphical objects is to avoid the need to remember command steps, the need to instead remember the associated data is counterproductive and self-defeating.

Yet another approach has been to use ever-larger device displays, especially in conjunction with computer systems. However, every additional inch of display screen on a conventional CRT device increases the cost not only in terms of dollars but in terms of space, as the size of the device display increases by at least the cube of the additional inch. In addition, more screen space is often associated with more toolbars and other clutter thereon, rather than more space for data. Furthermore, not all devices are amenable to larger display screens, including notebook computers, portable electronic devices, or other space-constrained or power-constrained applications; and not all environments have the physical space for such larger displays.

Whatever the size of the device display, the size of graphical objects and data must be large enough to be perceived and understood. Within these constraints, then, there is a need to optimize the display of graphical objects on the one hand, and the display of data and image on the other hand, in order to improve the ease of operating the graphical user interface. Unfortunately, the attempts of the current art to address this need have themselves been generally cumbersome to implement, and thus have suffered from various drawbacks and disadvantages.

For example, in the case of software applications running on the WINDOWS graphical operating system, users are generally free to select and customize the number and position of graphical objects and toolbars to be displayed. Presumably, users can display the graphical objects to which they need frequent access and hide those graphical objects which they seldom or never need to access.

While such flexibility is helpful in some instances, in many other instances the ability to custom select toolbars does not adequately address the need to optimize the display of graphical objects and the display of associated data. In particular, it is often not easy for a user to predict which toolbars and associated graphical objects ought to be displayed and which ones ought to be hidden for a given task. In addition, the need for different toolbars is likely to vary at different times during the operation of the associated software application.

The steps required to select the toolbars to be displayed can be somewhat involved. The user generally follows a series of branches of a command tree in the application. This means users must interrupt their thought processes or waste time to reconfigure the display of toolbars as needed.

Another approach available to the user of certain WINDOWS-based applications is so-called "full screen" mode. In this mode, as the name suggests, no toolbars or graphical objects are displayed and a display region for data occupies the full dimension of the display screen. A related feature of such "full screen" mode is that certain graphical objects are overlaid on the full screen of data when the cursor is positioned at the extreme perimeter of the display screen. The full screen mode has the disadvantage of displaying too few graphical objects under most circumstances. As such, when the user needs to access a command, the user must either remember the series of keystrokes which substitutes for selection of the graphical object, or must take extra steps to reactivate the tool bar with the appropriate graphical objects thereon. The former approach defeats the purpose of graphical objects by requiring the user to remember keystrokes. The latter approach of redisplaying the desired tool when in full screen mode still generally requires a certain amount of "hunting" to find the desired graphical object. Even if the desired toolbar is redisplayed, or even if the user toggles out of full screen mode by hitting "escape," the redisplayed toolbars are overlaid on the display region, and thus potentially mask the very data which needs to be visible in order to appropriately execute the desired commands.

Yet another attempted solution to the above-described needs is found in U.S. Pat. No. 5,644,737 (Tuniman). Toolbars containing sets of graphical objects are "stacked" substantially on top of each other, that is, in the "z" direction on the display, thereby using less screen space in the x and y directions. Each tool bar includes a label icon which remains visible irrespective of the position of such toolbar on the stack. The uppermost toolbar has all of its graphical objects displayed and available for selection by the user, whereas those underneath in the stack only have the label icon visible. To change which of the toolbars is displayed at the top, with all of its associated graphical objects visible, the user selects the label icon corresponding to the toolbar which he or she desires to have at the top of the stack.

While this approach avoids the need to display toolbars adjacent to each other in the x and y directions on the display screen, it suffers from some of the same drawbacks as the prior art solutions. Namely, one or more extra steps are required to have the appropriate toolbar available to interact with the data in the display region. Furthermore, the user must remember which "label" icon is associated with which toolbar, or the user must take the time to query each of the icons to bring the appropriate toolbar to the top of the stack by process of elimination. Again, as with the other approaches of the current art, the display of the toolbar, even though minimized by stacking, nonetheless is overlaid on top of the data in the display region and thus risks obscuring the data or image which needs to be visible in order to accomplish the desired tasks.

Another approach of the prior art is to use toolbars in the form of "drop-down" or "pull-down" menus. In this scenario, familiar to many computer users, multiple graphic objects in the form of command lists are grouped and hidden behind single text labels generally located at the perimeter of the display screen. Selecting one of these text labels at the perimeter of the screen causes the hidden command list generally to extend into the display region or work area of the application, so that further selection can be made from such command list. When the selection is completed, the expanded list retracts, revealing again the work area that was previously masked. In other variations, selecting a graphical object at the perimeter opens a dialogue box or other command boxes, generally appearing at a more central location on the display. In still other versions, the toolbar "floats" on the display screen in a position "unanchored" to the perimeter.

Each of these approaches, again, has various drawbacks and disadvantages, chief among them being that portions of the display region or work area are masked or obscured by activation of the graphical object, and such masking occurs right at the moment when data in the work area may need to be viewed in order to appropriately execute the command associated with the selected graphical object.

There is, thus, a need for a control program or operating system with an associated graphical user interface for computers, televisions, and any other devices with displays which displays or hides graphical objects more optimally than under current systems.

There is a corresponding need for the graphical user interface to be easy to operate, without introducing cumbersome additional steps into such operation.

It is further necessary to meet the above needs without unnecessarily impinging upon or otherwise masking the data or image in the working area of the display screen.

SUMMARY OF THE INVENTION

In accordance with the present invention, a control program or graphical operating system is provided for a screen of data on a display screen of an electronic device, such as an information handling system or computer, as well as a television, office equipment, manufacturing tool, or a consumer electronic device. The control program creates a graphical user interface having a window on the display screen which encompasses a predetermined area bounded by a perimeter. A display region is also defined in the window, and a screen of data is displayed in such display region. The window further includes a control region and a cursor which can be moved into and out of the control region. A tool area can be selectively displayed in the window, and the tool area has at least one graphical object or icon defined in the tool area and operatively associated with the window, the data, or the device. The user interface includes suitable programming for detecting the location of the cursor relative to the window, the control region, and the display region. In response to detection of the cursor in the control region, the control program and associated graphical user interface displays the tool area in the control region. As a result of the display of such tool area, the size of the display region is reduced and now has a second predetermined area less than the first predetermined area. The programming also detects when the cursor is outside of the control region and, in response to such detection, hides the tool area from display in the window. Suitable subroutines are provided for mapping the screen of data at two alternate scales. The first scale maps substantially all of the data screen onto the display region when such region is at its larger size, and the second scale corresponds to the display region at the smaller size which it assumes when graphical objects are being displayed.

When the control program of the present invention is used in conjunction with a television screen, the tool area includes graphical objects representing television channel controls, videotape controls, output display controls, electronic program guide controls, and other controls typically associated with broadcast, video, and digital programming.

When the control program of the present invention is used in conjunction with a computer system, the tool area includes buttons and other controls for managing the window or the data on the screen, such as scroll bars, three dimensional navigational controls, video display controls, and window resizing controls.

In one preferred embodiment, a plurality of graphical objects are arranged into tool bars, and such tool bars, in turn, are arranged around the perimeter of the window to define a frame. The size and location of the control region substantially corresponds to the size and location of the tool bars. As such, when the cursor is located in the frame, the tool bars which define the frame are displayed, whereas when the cursor is located inside or outside of the frame, the tool bars are hidden.

In accordance with another aspect of the present invention, the control program comprises a graphical operating system of a computer system. A window is defined having a first predetermined size and a control region is defined within the window and has a second predetermined size smaller than the window. A display region is further defined in the area of the window outside of the control region. The computer system is structured according to the present invention so that graphical objects are displayed in the control region in response to the cursor being located therein and are hidden from display in response to the cursor being located outside of the control region.

Significantly, the screen of data displayed in the window is rescaled by the computer system by a sufficient amount to fill substantially all of the display region with substantially all of the screen of data whenever the graphical objects are being displayed on the window. Conversely, when the graphical objects are hidden from display on the window, the computer rescales the screen of data to fill substantially all of the window with substantially all of the screen.

In accordance with another aspect of the computer system, the control region is subdivided into a plurality of subregions and subsets of the graphical objects are displayed in corresponding subregions. When the cursor is located in a given subregion, corresponding window management tools are displayed in such subregion. Likewise, when a cursor is not located in the given subregion, the corresponding window management tools are hidden from display.

The subregions, in another version of the present version, can be arranged into a plurality of concentric frames. In this configuration, the graphical objects corresponding to a given one of the concentric frames are displayed when the cursor is located in the control region and within the perimeter of the given frame.

BRIEF DESCRIPTION OF THE DRAWINGS

The invention will be better understood by reference to the attached drawings, in which.

DESCRIPTION OF THE PREFERRED EMBODIMENTS

In broad terms, the graphical operating system, control program, or other "system level" program of the present invention creates a graphical user interface which keeps data displayed on the screen from being masked or obscured when window management tools are also being displayed on the screen. This is accomplished by resizing or rescaling the screen of data to fit into a smaller display region when the window management tools are being displayed, and into a correspondingly larger region when the window management tools are hidden.

The above and other advantageous features are further described with reference to the figures and, in particular, with reference to FIGS. 1 and 2, which show a graphical user interface or "GUI" 21 in two different display modes. The various displays and interactions provided by GUI 21 are accomplished in conjunction with software programming, commands, drivers and other processing means of an operating system or other control program according to the present invention, such control program or operating system being shown schematically at 28 and being detailed further herein. Operating system or control program 28 operates in an electronic device such as a computer or television, or as part of office equipment, manufacturing tools, consumer electronic devices, and the like, one of such devices being represented schematically at 27. Electronic device 27 is suitably and operatively connected to a corresponding device display shown schematically at 29, and such device display 29 is equipped with a display screen 31.

Control program 28 and device display 29 cooperate in a manner known in the art so as to define a window 23 of predetermined area on display screen 31. A screen of data 25 is displayed in window 23. Although data in the illustrated embodiment comprise text characters, the term data more generally includes images such as graphics, photographs, and streaming video; and any other representations of information whether displayed in conjunction with a computer, television, or other type of electronic device 27.

GUI 21 includes a control region 35 within window 23 and a display region 37 corresponding to the area of window 23 outside of control region 35. The user of GUI 21 may selectively move cursor 33 into and out of control region 35.

Figure 2:
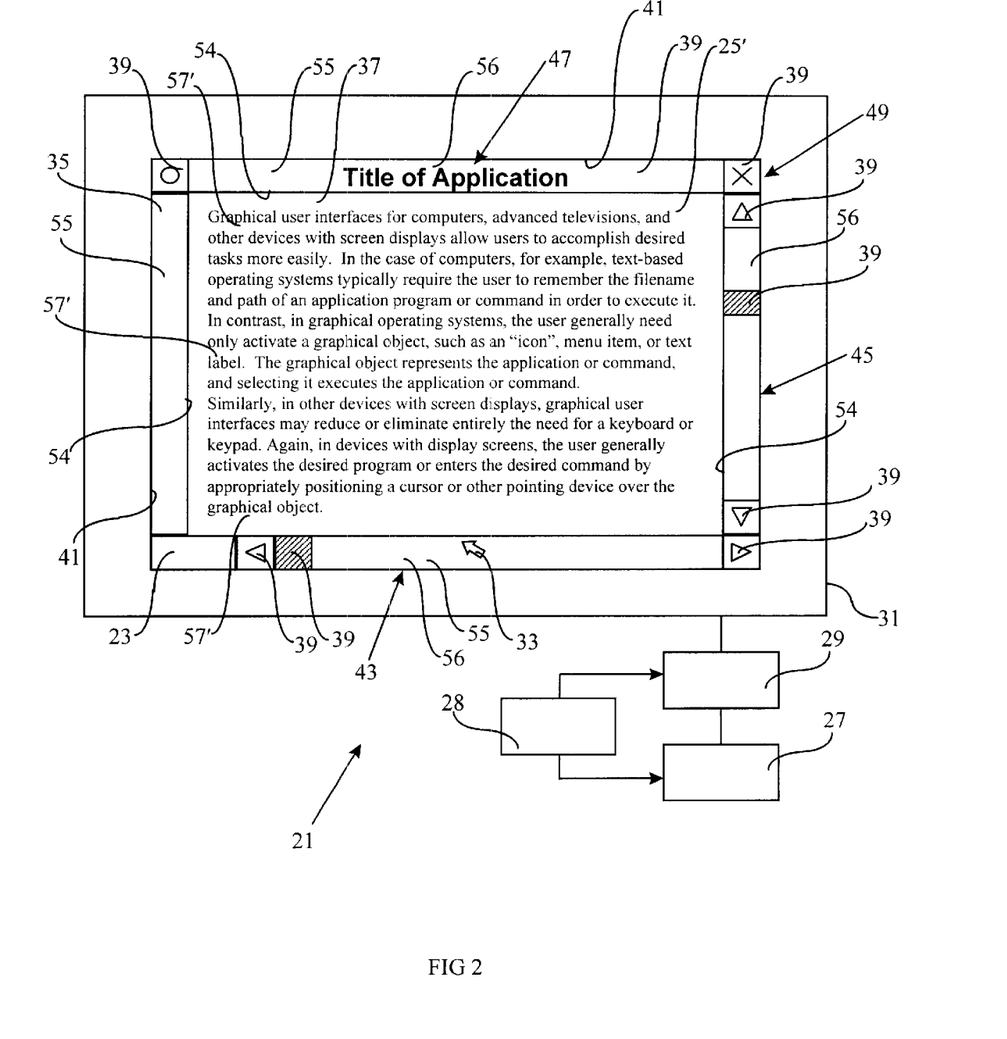

When cursor 33 is within the area defined by control region 35, as shown in FIG. 2, graphical objects 39 are displayed at predetermined locations within window 23 corresponding to a tool area 55. Tool area 55 preferably comprises multiple toolbars 56 at or near a perimeter 41 (also considered an exterior perimeter since it resides closer to the edge) of window 23 and extending inwardly from perimeter 41 to terminate in inner tool area edge 54 (also considered an interior perimeter since it resides closer to the center of the window 23). Graphical objects 39 can be any of the various tools for managing characteristics of the window 23, of data screen 25, or of associated software applications. Such graphical objects 39 include buttons corresponding to commands for manipulating data in the window, on-screen menu items, scroll bars, and the like. In general terms, then, graphical objects 39 correspond to commands or instructions of a software application or of the operating system 28, such instructions managing characteristics of the window 23, the screen of data 25, or the device 27 itself. In the embodiment shown in FIG. 2, graphical objects 39 include horizontal and vertical scroll bars, 43 and 45 respectively, title bar 47, and window closing button 49.

Figure 1:
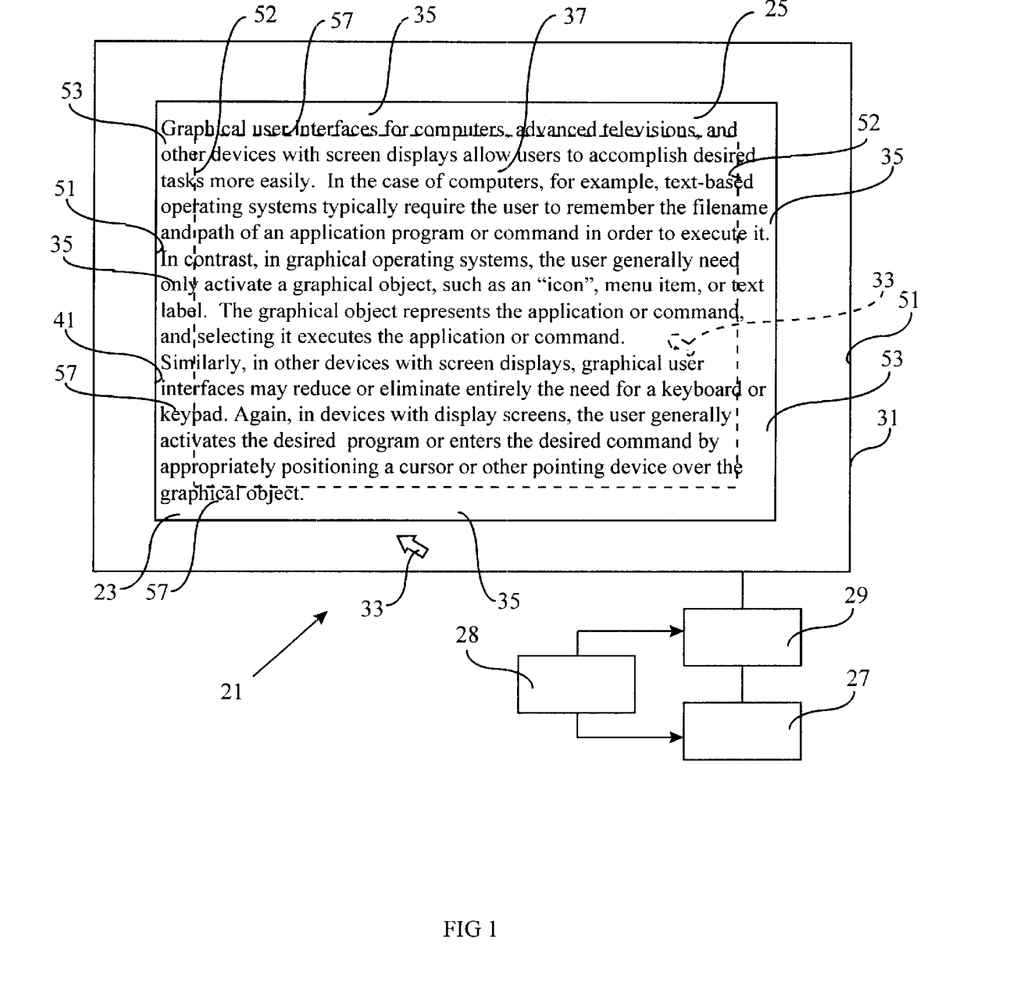
FIGS. 1 and 2 are views of a device display showing the associated display screen at various points during operation of the control program or graphical operating system of the present invention.

When the user moves cursor 33 to locations on display screen 31 outside of control region 35, as shown in FIG. 1, program 28 detects such location and, in response thereto, executes programming steps to hide or end the display of graphical objects 39. In the embodiment illustrated in FIGS. 1 and 2, control region 35 preferably has an outer edge 51 substantially co-extensive with at least a portion of periphery or perimeter 41 of window 23. Even more preferably, control region 35 comprises a series of bars or a window frame 53 adjacent to periphery 41 of window 23, the control region 35 extending inwardly to end at an inner edge 52 shown in phantom lines in FIG. 1. Graphical objects 39 are hidden from view or not displayed when cursor 33 is outside of window frame 53 as shown in solid lines in FIG. 1 or completely inside window frame 53 as shown in phantom lines.

A significant feature of the present invention is that the display of graphical objects 39 (FIG. 2) is accomplished without masking, covering up, or otherwise obscuring the screen of data 25 or the data displayed therein. This desirable goal is accomplished by suitable programming of control program or operating system 28, which resizes or rescales the screen of data 25 from its first, larger size (corresponding substantially to the area of window 23 shown in FIG. 1), to a second, smaller size screen of data 25' (corresponding to the area of display region 37). In the illustrated embodiment, upon display of graphical objects 39 adjacent to perimeter 41, the rescaling means reduces the length and width of screen of data 25 by a first pair of respective percentages to substantially fill the smaller display region 37. When graphical objects 39 are hidden, the length and width of screen of data 25' are increased by an inverse set of percentages to substantially fill window 23.

In the embodiment illustrated in FIGS. 1 and 2, the size and location of control region 35 substantially corresponds to the tool area 55 at window perimeter 41 in which graphical objects 39 are displayed. Control region 35 and tool area 55 need not necessarily correspond to each other. For example, control region 35 can be defined to extend across the entire area of window 23 rather than merely as a window frame 53. In such case, graphical objects 39 would be displayed in tool area 55 when cursor 33 is located as shown in phantom lines in FIG. 1, that is, when cursor 33 is located inside of inner edge 54 of tool area 55.

The rescaling functions of the present invention are accomplished so that data screen 25 substantially fills window 23 when graphical objects 39 are hidden, and substantially fills display region 37 when graphical objects are displayed. In this way, screen of data 25 and 25' contains the optimal amount of data subject to the space constraints of window 23 and display region 37, respectively. Furthermore, when the graphical objects 39 are hidden, as shown in FIG. 1, all of window 23 can be devoted to displaying data screen 25. Thus, for data at a given scale or size, more data can be viewed in window 23 by virtue of hiding the graphical objects 39, which allows easier manipulation of data by the user.

Furthermore, because the display of graphical objects 39 is accomplished without masking any of the data screen 25, data 57 near the perimeter of window 23 as shown in FIG. 1 remains visible as text 57' in screen of data 25' in FIG. 2. Otherwise stated, the same amount of data (without scrolling) is displayed in screen of data 25' as a single screen of data 25 because of suitable programming for mapping such data at first and second alternate scales.

Figure 3:
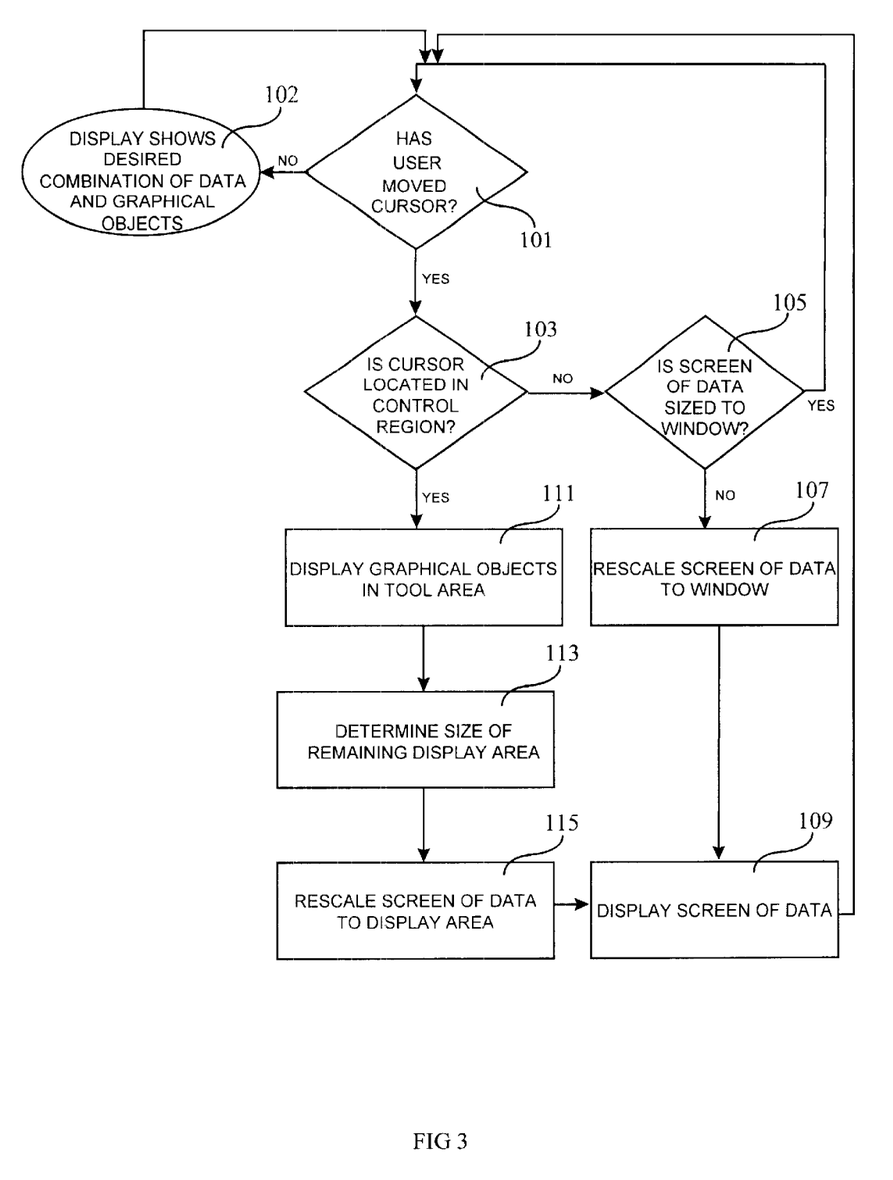
FIG. 3 is a flow chart illustrating part of the logic of the program of the present invention.

The logic of program 28, which is associated with selectively displaying graphical objects 39 on display screen 31, is illustrated by means of a flowchart shown in FIG. 3. The first step begins with logic block 101 which determines whether cursor 33 has moved. If not, then program 28 considers the display screen 31 to be showing the desired combination of data and graphical objects 39, as represented by output block 102. If, however, the programming detects that cursor 33 has been moved from its previous position, a determination is then made, as shown in logic block 103, as to whether cursor 33 is located in control region 35. If not, then the program determines whether screen of data 25 is sized to substantially fill window 23, as shown in logic block 105. If the screen of data 25 is sized to substantially fill window 23, then the program 28 again checks whether cursor 33 has moved, recommencing the aforementioned steps.

Returning to logic block 105, if the screen of data 25 is not sized to substantially fill window 23, then screen of data 25 is suitably manipulated by rescaling so that it substantially fills window 23, as set out in block 107. Once rescaling to fit in window 23 has been completed, screen of data 25 is displayed as shown in block 109.

In the event cursor 33 is located in control region 35, program 28 causes GUI 21 to display graphical objects 39 at locations on display screen 31 corresponding to tool area 55, as indicated by block 111. Prior to or contemporaneous with the display of graphical objects 39, suitable programming determines the remaining size of display area or region 37 as a result of display of graphical objects 39 (see block 113). Also during the foregoing steps, suitable rescaling calculations are made so that data is displayed at the appropriate size to substantially fill display area or region 37, as shown by logic block 115. After such rescaling, screen of data 25' is displayed in window 23. Once screen of data 25' has been displayed, the logic begins anew at block 101, by determining whether a cursor movement has occurred.

GUI 21 and its associated program 28 can operate on any of a variety of display screens 31 and associated electronic devices. For example, GUI 21 can be used in a manufacturing tool, for office equipment, or for a consumer electronic device, each of which is provided with a suitably sized and configured display screen 31.

Graphical objects 39 may also vary depending on the particular electronic device 27 with which they are associated. One suitable application of the present invention would be the so-called "advanced" or digital televisions, or "PC/TVs," in which typical television functions and television device displays are augmented with microprocessing or software functions. The GUI 21 of the present application allows for relatively easy operation of such enhanced functions. In such an environment, the GUI 21 may make available graphical objects corresponding to television channel controls, videotape controls, output display controls, controls for viewing electronic program guide information, and controls for manipulating such information.

Figure 4A:
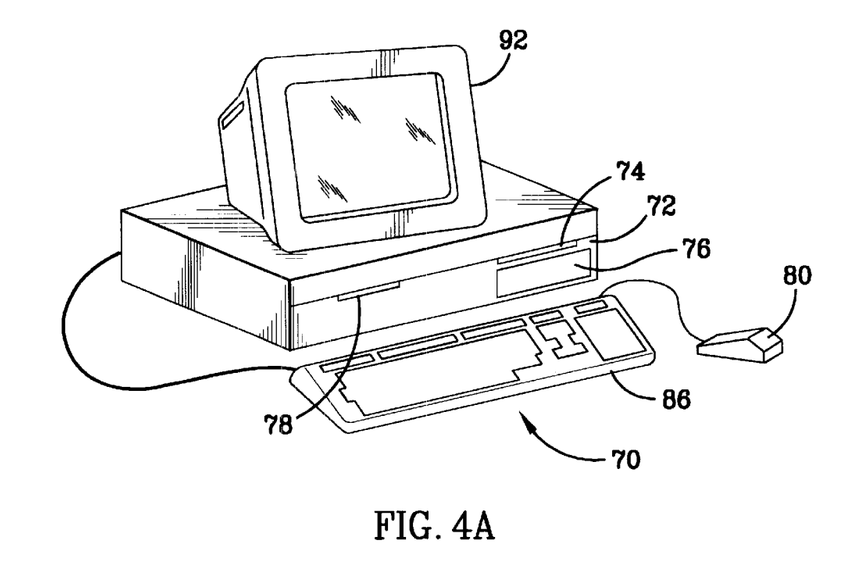
FIG. 4A is a general view of a computer system suitable for use in implementing the present invention.
Figure 4B:
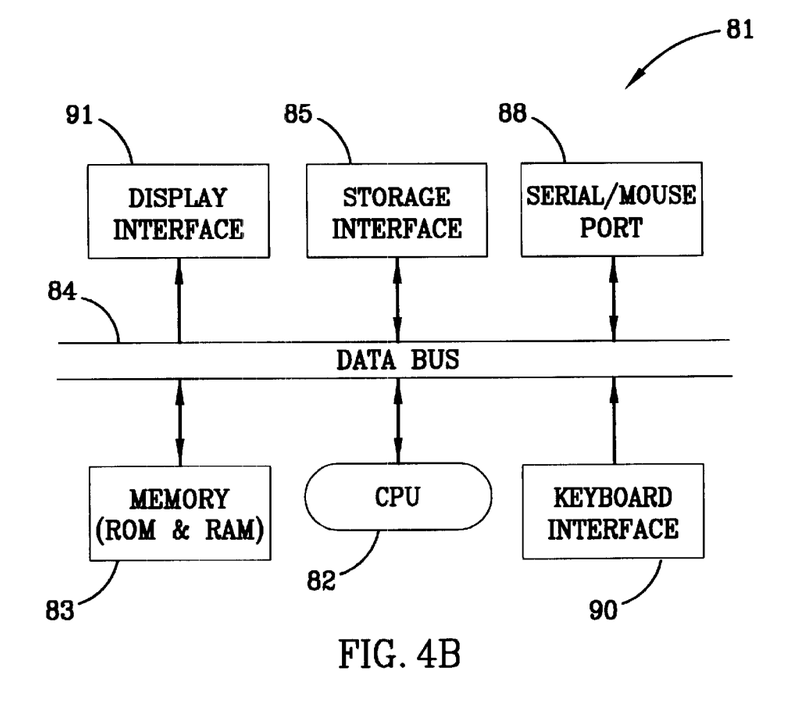
FIG. 4B is a block diagram showing some of the principal components of the computer system of FIG. 4A.

In another preferred embodiment, GUI 21 of the present invention is associated with an electronic device 27 in the form of an information handling system, or computer system, which is shown schematically in FIGS. 4A and 4B. In particular, personal computer 70 includes a frame 72 in which are mounted a motherboard and a variety of other printed circuit cards (not shown), as may be required for the particular computer. A floppy drive 74, hard drive 76, and CD ROM drive 78 are provided and operatively connected as discussed below. The means for moving cursor 33 comprises a mouse 80 which is likewise used to select and activate graphical objects 39 in a manner generally known.

Referring now to FIG. 4B, motherboard 81 includes a central processing unit 82, and memory (ROM and RAM) 83 is connected by a suitable databus 84 to CPU 82. Storage interface 85 is likewise connected to databus 84 and allows access to the various data storage devices discussed above, that is, the floppy drive 74, hard drive 76, and CD ROM drive 78. Interfaces and suitable connections known in the art are also provided for the mouse 80 and the keyboard 86, such interfaces being shown at 88 and 90 schematically. The additional architectural features of personal computer systems are generally well known to those of ordinary skill in the art and thus will not be further disclosed in connection with the present invention.

In the context of computer system 70, device display 29 (FIGS. 1–2) comprises a suitable computer monitor 92 (FIG. 4A), on which display screen 31 is used to display window 23 (FIGS. 1–2). Device display 29 is operatively connected to a suitable display interface 91 and related drivers (not shown).

In computer system 70, graphical objects 39 and associated tool area 55 comprise any of the various on-line menu items, command lists, buttons, icons, scroll bars, or other window and data management controls and tools associated with the operating system 28, software applications, or associated data. By way of example and not limitation, graphical objects 39 include the scroll bars 43 and 45 (as shown in FIG. 2), controls for navigating a three-dimensional image, video display controls, window resizing controls, and text processing controls.

In addition to the variations and alternatives already discussed, further features and variations are possible within the scope of the present invention. For example, in an alternative embodiment illustrated in FIG. 5, the rescaling functions discussed with reference to FIGS. 1 and 2 can be tailored so that a first subset of graphical objects 238 (phantom lines) is hidden whereas a second subset of graphical objects 239 remains displayed. Which of the subsets is hidden and which displayed, and in response to which corresponding cursor locations, are all parameters which can be varied depending on the needs of the particular application.

Figure 5:
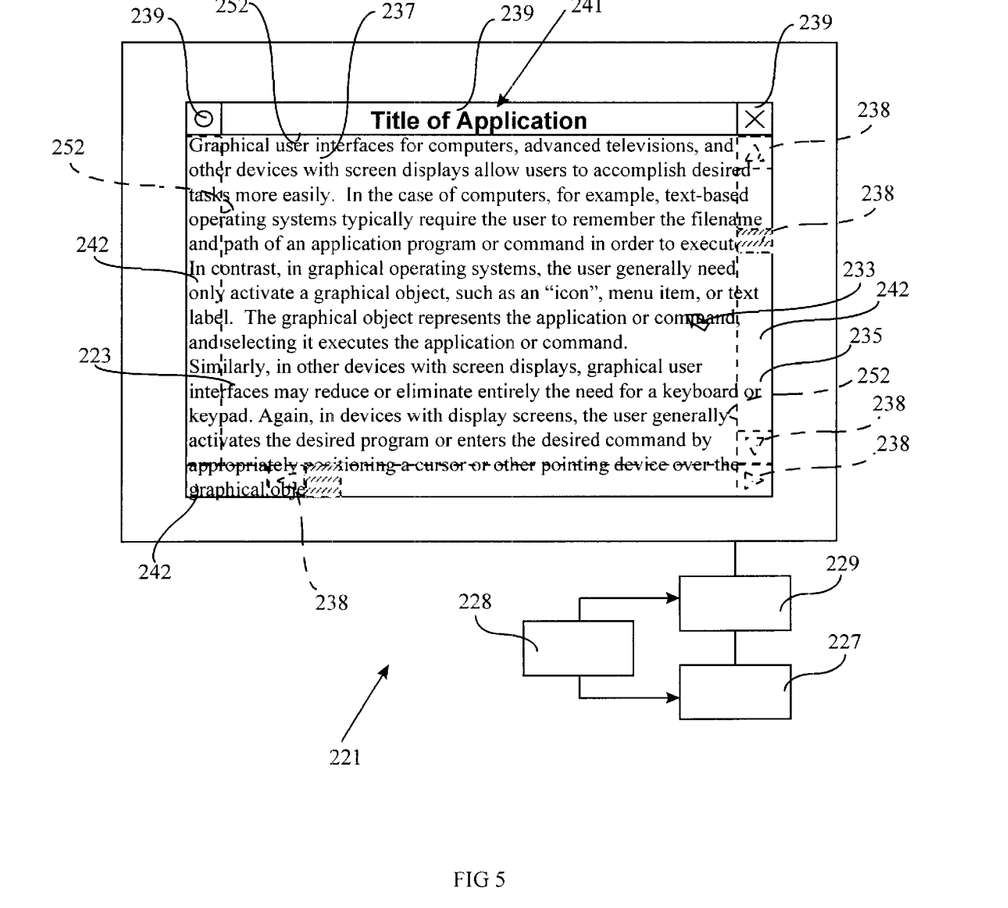
FIG. 5 is a view of the display screen of an alternate embodiment of the present and invention.

Operating system 228 can optionally include programming routines which permit the user to customize the location and size of control region 235. Such programming may also allow users to select the graphical objects 239 which are displayed, the location of such displays, additional groundrules associated with such displays, and the size and location of the control region 235.

In FIG. 5, graphical objects 239 correspond to a title bar 241, and the corresponding GUI 221 has title bar 241 always visible irrespective of the location of cursor 233. In this alternative embodiment, when graphical objects 238 are hidden as shown in phantom lines in FIG. 5, the rescaling functions display data screen 225 in window 223, which window includes areas 242 previously occupied by graphical objects 238. When graphical objects 238 are displayed, the screen of data 225 is reduced in scale to fit within display area 237 defined within inner perimeter 252 of graphical objects 238 and 239. It will be appreciated that the graphical objects which remain visible irrespective of cursor location can be located anywhere in window 223 and can correspond to any of a variety of functions depending on the particular application. Thus, in the case of advanced television or PC/TVs, it may be desirable for a banner area at the top and a tuning area at the bottom to always remain in view.

Figure 6:
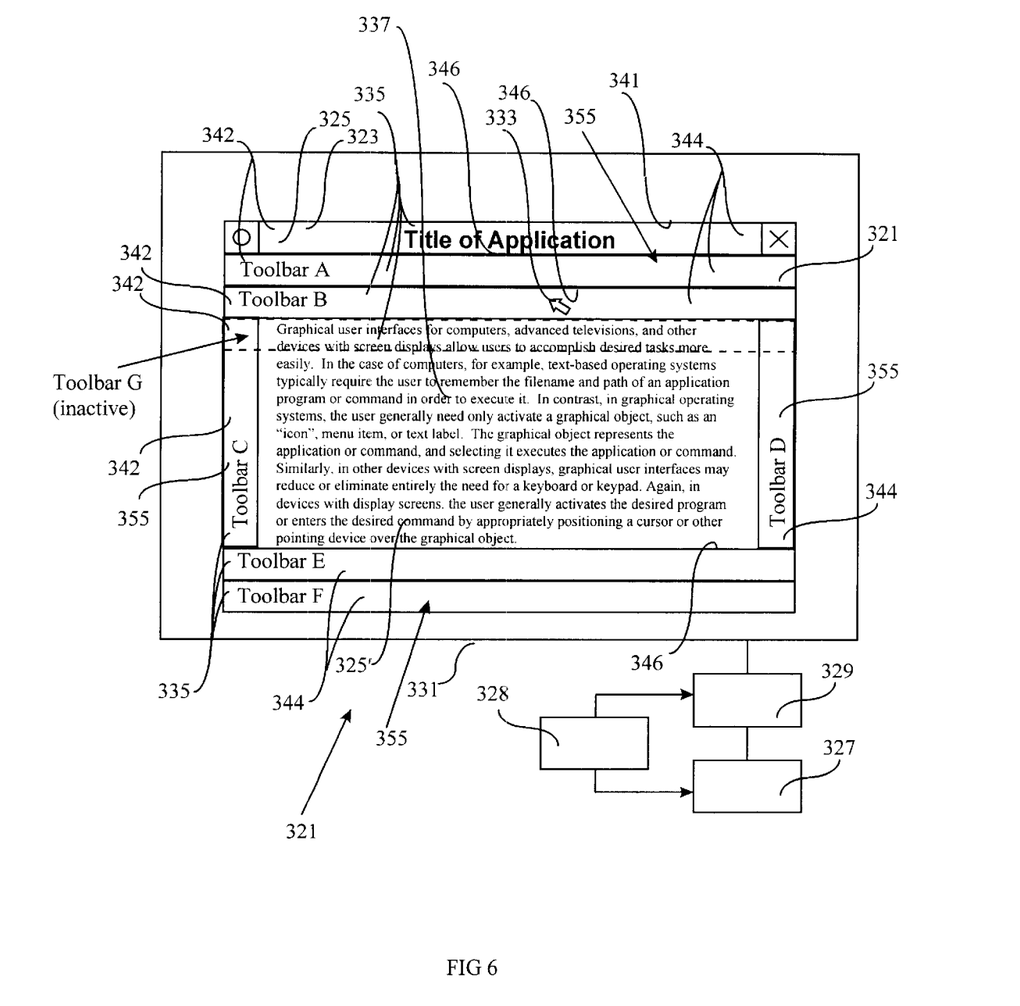
FIG. 6 is a view of the display screen of a second alternate embodiment of the present invention.

Still another alternative embodiment is illustrated in FIG. 6. As in the previous embodiments, window 323 is defined on display screen 331. A control region 335 is defined at perimeter 341 of window 323, and in this embodiment, such control region 335 corresponds in size and location to tool area 355 in which graphical objects are selectively displayed. Tool area 355 is subdivided into multiple toolbars 344, including those labeled Toolbars A through G. Unlike the previous embodiments, GUI 321 has suitable programming for logically subdividing control region 335 into multiple control subregions 342, corresponding to respective toolbars 344. Subregions 342 are bounded by respective perimeters 346. Any of a variety of graphical objects (not shown) are included in the various toolbars 344 subdividing tool area 355.

In this alternative embodiment, when cursor 333 is located in or to the inside of one or more control subregions 342, then the associated toolbar(s) 344 is (are) displayed. If cursor 333 is located to the outside of a given one or more subregions 342, then the corresponding toolbar(s) 344 is (are) not displayed. By way of example and not limitation, FIG. 6 shows cursor 333 located outside of toolbar G, within toolbar B, and to the inside of the toolbar A. This results in the hiding of toolbar G as represented by the phantom lines, and the display of toolbars A and B and the other toolbars (solid lines).

Of course, any of a variety of hiding and display groundrules can be adopted for displaying toolbars 344, depending on the preference of the users or the needs of the particular application. One such variation provides programming to display only the toolbar 344 in which cursor 333 is located, and hide any others. A still further variation is to have subregions 342 in the form of concentric frames and GUI 321 responsive to location of cursor 333 within the inside perimeter of such subregion frames.

If control program 328 displays multiple, adjacent toolbars 344, the size of display region 337 may be so reduced by display of such toolbars as to make the rescaled data of screen of data 325' illegible or indiscernible. In such circumstances, program 328 optionally includes certain limits to the amount of reduction of data screen 325'. Similarly, program 328 may be provided with subroutines which encourage or restrict the addition of toolbars to locations on the display screen which maintain its aspect ratio (length to width) within certain parameters so as to avoid excessive distortion of data in any given direction. Such groundrules may have set defaults which are variable by the user depending on the particular needs of the application.

Common to all the above scenarios, however, is the resizing or rescaling of the screen of data 325 in response to such display or hiding operations, to fill substantially the area of window 323 not occupied by tool bars 344.

In addition to the advantages apparent from the foregoing description, the control program or operating system according to the present invention creates a graphical user interface which displays window management tools and other graphical objects only when needed, such need being easily signaled by the user placing the cursor in a corresponding control region of the display screen.

By appropriately rescaling data to fill whatever display area is not occupied by graphical objects, the invention advantageously avoids covering up potentially critical data with graphical objects. The invention advantageously avoids the inconvenience and aggravation of having previously visible data become masked because of the appearance of the tool bar.

The hiding or nondisplay of the graphical objects has the related advantage of optimizing the space available in the active window for viewing data.

Still another advantage of the present invention is that visual clutter, and its attendant distraction, is minimized by displaying graphical objects only when needed.

A further advantage of the present invention is that scrolling either horizontally or vertically is reduced by displaying the same, optimal amount of data whether or not the toolbars are hidden. By reducing time spent scrolling to find data, the processing of such data and any frustration associated with excessive scrolling are minimized.

As yet another advantage, the user of the present invention does not have to remember or execute cumbersome, multi-step procedures in order to rescale the data or to hide graphical objects and their associated toolbars. Instead, the graphical objects are hidden (and redisplayed) "on the fly" in response to location of the cursor in the appropriate area. As such, it is more likely that the data that relate to the graphical objects selected will be visible to the user so that he or she may perform the desired task.

A still further advantage is the reduction of time spent "hunting" for the appropriate toolbar or graphical object. Location of the cursor in the appropriate control region displays the predetermined toolbar without having to sort through stacks of toolbars, execute multiple commands, or take other steps which waste valuable time.

Although the present invention has been described in connection with the preferred form of practicing it, modifications which fancy or skill in the art may suggest are considered to fall within the spirit and scope of the claims that follow. Accordingly, it is not intended that the scope of the invention in any way be limited by the above description, but that it be determined entirely by reference to the claims that follow.

What is claimed is:

1. A system having a display for viewing a screen of data in a window of a first predetermined size, the system comprising:

means for defining a control region within the window and a display region having a second predetermined size less than the first predetermined size;

a cursor selectively moveable into and out of the control region;

means for managing characteristics of at least one of the window and the screen of data displayed therein;

graphical objects corresponding to the managing means;

means for displaying the graphical objects in the control region in response to the cursor being located in the control region, and for hiding the graphical objects from display in the window in response to the cursor being located outside the control region;

means for rescaling the screen of data by a sufficient amount to fill substantially all of the display region with substantially all of the screen of data in response to the display of the graphical objects, and to fill substantially all of the window with substantially all of the screen of data in response to the hiding of the graphical objects.

2. The system of claim 1, wherein the control region has an outer edge substantially coextensive with at least a portion of the periphery of the window, and wherein the display region corresponds to the area of the window exclusive of the control region.

3. The system of claim 2, wherein the control region comprises a window frame defined adjacent to the periphery of the window.

4. The system of claim 3, wherein the frame has an inner frame edge and the display region has an outer perimeter substantially adjacent to the inner frame edge, the outer perimeter bounding an area having a third predetermined size, the rescaling means comprising means for altering by predetermined percentages the length and width of the screen of data between the first predetermined size and the third predetermined size.

5. The system of claim 1, wherein the control region comprises a plurality of subregions.

6. The system of claim 5, wherein the graphical objects comprise window management tools, and wherein the displaying and hiding means comprise means for displaying a subset of the window management tools in one of the subregions when the location of the cursor is in the one subregion.

7. The system of claim 6, wherein the control region comprises a plurality of bars located proximate to the edges of the window, the one subregion containing at least one of the bars.

8. The system of claim 7, wherein the bar contained in the one subregion is located at one of the top and the bottom of the window, and further comprising means for displaying indicia related to the content of the window in the bar contained in the one subregion.

9. The system of claim 8, wherein the one subregion is located at both the top and the bottom of the window and has two of the bars contained therein.

10. The system of claim 5, wherein the graphical objects comprise window management tools, and wherein the displaying and hiding means comprise means for displaying a subset of the window management tools in a corresponding one of the subregions in response to the cursor being located in the corresponding subregion, and hiding the subset in response to the cursor being located outside the corresponding subregion.

11. The system of claim 5, further comprising means for allowing user assignment of the graphical objects to the subregions.

12. The system of claim 5, wherein each of the subregions has a corresponding exterior and interior perimeter, and wherein the displaying means comprises means for displaying the graphical objects corresponding to a given subregion in response to the cursor being located within the exterior and interior perimeter of the given subregion.

13. The system of claim 12, wherein the subregions comprise a plurality of concentric frames and the displaying means comprises means responsive to location of the cursor within a given frame for displaying said given frame.

14. The system of claim 1, wherein the managing means comprises at least one means selected from the group consisting of means for resizing the window, means for scrolling the data vertically, means for scrolling the data horizontally, means for navigating a three-dimensional image represented by the data, means for controlling the viewing of video images, means for controlling the viewing of digital images, and means for processing text.

15. A system for displaying data, the system comprising:
a display;
a graphical user interface operatively associated with the display, the graphical user interface comprising:
a window encompassing a predetermined array of pixels, the window having a perimeter and a corresponding first predetermined area, the window having portions defining a control region and a tool area, the tool area extending inwardly from the perimeter of the window and not extending over a remaining area of the window, the remaining area defining a display area having a second predetermined area and a display region;
a cursor selectively movable into and out of the control region;
graphical objects selectively displayed in the window for managing characteristics of at least one of the window and the data screen displayed therein;
a screen of the data for display in the window, the data displayed in the form of at least one of text or image;
a graphical operating system, said graphical operating system comprising:
means for displaying the window on the display;
means for displaying the screen of data in the window;
means for displaying the graphical objects in the tool area of the window in response to the cursor being located in the control region;
means for hiding the graphical objects from display in the window in response to the cursor being located outside the control region; and
means for resealing the length and width of the screen of data by a first percentage in response to the display of the graphical objects to substantially fill the display region with substantially all of the screen, and by a second percentage in response to the hiding of the graphical objects to further occupy the tool area previously occupied by the graphical objects and to substantially fill the first predetermined area of the window with substantially all of the screen.

16. The system of claim 15, wherein the control region is located proximate to the perimeter of the window, and wherein the tool area corresponds in size and location to the control region.

17. A method for displaying a screen of data on a display screen of an electronic device, such as a computer, a television, office equipment, manufacturing tool, or a consumer electronic device, the method comprising:
defining a window on the display screen, having a first predetermined area bounded by a perimeter;
defining a display region in the window in which the screen of data is displayed;
defining a control region in the window;
displaying a tool area in the window, the tool area comprising at least one graphical object;
providing a cursor moveable on the display screen;
selectively moving the cursor about the display screen;
detecting the location of the cursor relative to the window, the control region, and the display region;
displaying the tool area in the control region in response to detection of the cursor in the control region, the display of the tool area reducing the size of the display region to a second predetermined area;
hiding the tool area in response to detection of the cursor outside of the control region;
mapping the screen of data at first and second alternate scales, the first scale selected to substantially fill the display region with substantially all of the screen of data when the display region occupies the first predetermined area, the second scale selected to substantially fill the display region with substantially all of the screen of data when the display region occupies the second predetermined area; and
displaying the screen of data at the first scale in response to detection of the cursor outside the control region, and at the second scale in response to detection of the cursor inside the control region.

18. The method of claim 17, wherein displaying the tool area comprises displaying at least one tool bar, and wherein defining the control region comprises having the size and location of the control region substantially correspond to the size and location of the tool area.

19. The method of claim 18, comprising arranging a plurality of toolbars around the perimeter of the window to define a frame.

20. The method of claim 17 for a television screen, wherein displaying the tool area comprises displaying graphical objects corresponding to device controls selected from the group consisting of television channel controls, videotape controls, output display controls, and electronic program guide controls.

21. The method of claim 17 for a computer system, wherein displaying the tool area comprises displaying graphical objects selected from the group consisting of scroll bars, controls for navigating a three-dimensional image represented on the screen, video display controls, and window resizing controls.

22. A method of selectively displaying graphical objects and an associated screen of data on a display screen, the method comprising:
defining on the display screen a window;
providing a cursor moveable on the display screen;
defining a control area in the window;
displaying the graphical objects in a tool area in the window in response to location of the cursor being in the control area;

in response to the display of the graphical objects, reducing the size of a data displayable region by an amount substantially corresponding to the tool area to define a display region having an area less than the area of the window;

scaling the screen of data in response to location of the cursor in the control area to substantially fill the display region with the screen of data;

removing the tool area from the window in response to the cursor being located outside the control region;

scaling the screen of data in response to location of the cursor outside the control area to substantially fill the area of the window previously occupied by the tool area and to substantially fill the window with substantially all of the screen of data.

23. The method of claim 22 for displaying graphical objects in the form of scroll bars in a display screen, the method further comprising:

defining the control area at the perimeter of the window;

locating and sizing the tool area to substantially correspond to the size and location of the control area; and displaying the scroll bars in the tool area;

wherein the steps of scaling the screen of data comprise the steps of adjusting by predetermined percentages the length and width of the screen of data.

24. The method of claim 22 for a television, wherein the step of displaying the graphical objects comprises displaying buttons corresponding to controls selected from the group consisting of television channel controls, videotape controls, output display controls, and electronic program guide controls.

25. The method of claim 22 for an information handling system, wherein the step of displaying the graphical objects comprises displaying buttons corresponding to controls selected from the group consisting of scroll bars, controls for navigating a three-dimensional image represented on the screen, video display controls, and window resizing controls.

* * * * *